United States Patent
Dutton et al.

(10) Patent No.: US 9,639,063 B2
(45) Date of Patent: May 2, 2017

(54) TIME TO DIGITAL CONVERTER AND APPLICATIONS THEREOF

(71) Applicant: STMicroelectronics (Research & Development) Limited, Marlow, Buckinghamshire (GB)

(72) Inventors: Neale Dutton, Edinburgh (GB); Robert K. Henderson, Edinburgh (GB); Salvatore Gnecchi, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 325 days.

(21) Appl. No.: 14/451,482

(22) Filed: Aug. 5, 2014

(65) Prior Publication Data

US 2015/0041625 A1 Feb. 12, 2015

(30) Foreign Application Priority Data

Aug. 6, 2013 (GB) .................................. 1314055.3

(51) Int. Cl.
| | |
|---|---|
| H03M 1/06 | (2006.01) |
| G04F 10/00 | (2006.01) |
| G01T 1/24 | (2006.01) |
| G01T 1/29 | (2006.01) |

(52) U.S. Cl.
CPC ............ G04F 10/005 (2013.01); G01T 1/248 (2013.01); G01T 1/2985 (2013.01)

(58) Field of Classification Search
CPC .............................. H03M 1/06; H03M 1/0656
USPC ............. 250/208.1, 214 R; 341/94, 118, 160
See application file for complete search history.

(56) References Cited

U.S. PATENT DOCUMENTS

| | | |
|---|---|---|
| 6,346,905 B1 | 2/2002 | Ottini et al. |
| 6,965,407 B2 | 11/2005 | Boemler et al. |
| 8,432,304 B2 | 4/2013 | Dutton |
| 8,669,512 B2 | 3/2014 | Nevet et al. |
| 8,822,900 B2 | 9/2014 | Richardson et al. |
| 2007/0096836 A1 | 5/2007 | Lee et al. |
| 2009/0141595 A1 | 6/2009 | Huang et al. |
| 2010/0134335 A1* | 6/2010 | Park ........................ G04F 10/06 341/118 |
| 2011/0001492 A1 | 1/2011 | Nys et al. |
| 2014/0124652 A1 | 5/2014 | Dutton et al. |

OTHER PUBLICATIONS

UK-IPO Search Report for GB 1314055.3 mailed Feb. 28, 2014 (3 pages).

* cited by examiner

*Primary Examiner* — Kevin Pyo
(74) *Attorney, Agent, or Firm* — Gardere Wynne Sewell LLP

(57) ABSTRACT

A time to digital converter includes a sample module operable to sample an input signal at multiple different instances of time. A transition detection module, formed of comparison elements, processes the sampled input signal at successive time instances so as to detect transitions in the input signal in terms of time. An output module generates detected transitions in the input signal on multiple parallel outputs.

35 Claims, 14 Drawing Sheets

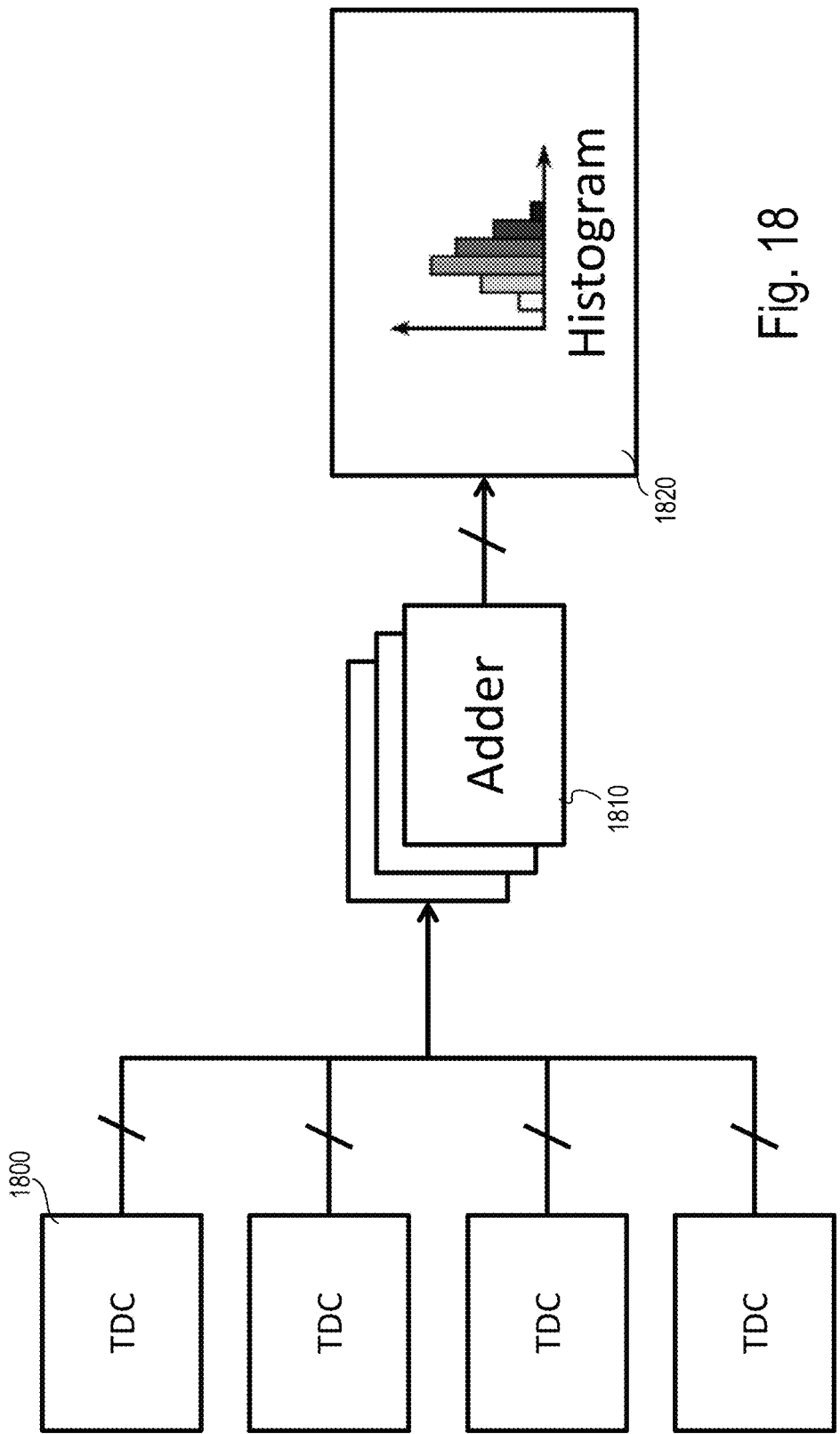

US 9,639,063 B2

TIME TO DIGITAL CONVERTER AND APPLICATIONS THEREOF

PRIORITY CLAIM

This application claims priority from Great Britain Application for Patent No. 1314055.3 filed Aug. 6, 2013, the disclosure of which is incorporated by reference.

TECHNICAL FIELD

This invention relates to time to digital converter (TDC) circuits, and in particular such circuits being suitable for time of flight imaging applications.

BACKGROUND

Time of flight imaging is used in a number of applications including range finding, depth profiling, 3D imaging (e.g. LIDAR) and medical imaging techniques. Direct time of flight measurement comprises directly measuring the length of time between emitting radiation and sensing the radiation after reflection from an object. From this the distance to the object can be determined. In specific applications, the sensing of the reflected radiation may be performed using a Single Photon Avalanche Diode (SPAD) array. SPAD arrays have been used as solid-state detectors in imaging applications where high sensitivity and timing resolution are required.

A SPAD is based on a p-n junction device biased beyond its breakdown region. The high reverse bias voltage generates a sufficient magnitude of electric field such that a single charge carrier introduced into the depletion layer of the device can cause a self-sustaining avalanche via impact ionization. The avalanche is quenched, either actively or passively to allow the device to be "reset" to detect further photons. The initiating charge carrier can be photo-electrically generated by means of a single incident photon striking the high field region. It is this feature which gives rise to the name 'Single Photon Avalanche Diode'. This single photon detection mode of operation is often referred to as 'Geiger Mode'.

Time to digital converters are sometimes used in time of flight imaging applications to increase timing resolution over that of a single clock cycle. However, TDC circuits are presently only able to process one event in a single measurement cycle.

It would be desirable to provide a TDC that is able to process multiple events in a single measurement cycle.

SUMMARY

In a first aspect there is provided a time to digital converter comprising: a sample module operable to sample an input signal at multiple different instances of time; a transition detection module comprising a plurality of comparison elements, each of which being operable to compare the input signal as sampled at successive time instances so as to detect transitions in the input signal in terms of time; and an output module comprising multiple parallel outputs operable to output in parallel said detected transitions in the input signal.

Also disclosed are various systems, including an imaging system and time of flight measurement system, comprising the time to digital converter of the first aspect.

In a second aspect there is provided a method of performing time to digital conversion comprising: sampling an input signal at multiple different instances of time; comparing the input signal as sampled at successive time instances so as to detect transitions in the input signal in terms of time; and outputting in parallel said detected transitions in the input signal.

Other optional aspects are as described in the appended dependent claims.

BRIEF DESCRIPTION OF THE DRAWINGS

Embodiments will now be described, by way of example only, by reference to the accompanying drawings, in which:

FIG. 18 shows a time to digital converter arrangement comprising multiple TDCs used in parallel;

DETAILED DESCRIPTION OF THE DRAWINGS

Figure 1:
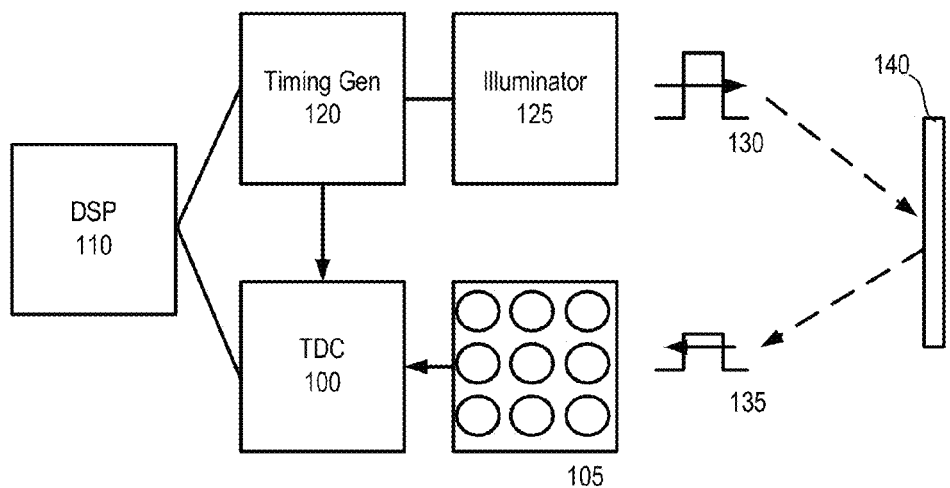
FIG. 1 shows a first time of flight imaging system according to an embodiment.

FIG. 1 shows the basic components of a time of flight measurement system. It comprises a digital signal processor (DSP) 110, a timing generator 120 which controls timing of an illumination source 125, a SPAD array 105 and a timing to digital converter (TDC) 100 arranged as shown. The illumination source 125 emits a radiation pulse 130 at a time controlled by the timing generator 120. Radiation 135 is reflected back from the object 140, and is sensed by SPAD array 105. The Time to Digital converter 100 (which may be any of those described herein) measures the time of flight of the illumination pulse 130, 135 over the return journey from illuminator 125 to object 140 and back to the SPAD array 105.

Figure 2:
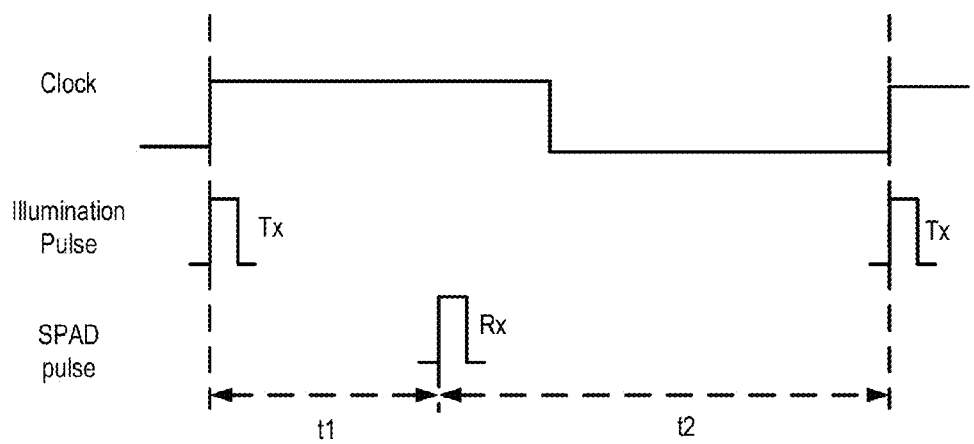
FIG. 2 is a timing diagram illustrating both forward and reverse mode time of flight operation.

The time of flight measurement system may operate either in a "forward mode" or in a "reverse mode". In "forward mode" the time measurement is commenced by the illumination source pulse and ended by a SPAD event such that the time measured is the time of flight of the illumination pulse. In "reverse mode" the time measurement is commenced by a SPAD event, and ended by the next illumination source pulse, such that the time measured is the time within a clock cycle (or other time frame) outside of the time of flight of the illumination pulse. As the time frame is of fixed length, the time of flight is easily calculated from this. This is illustrated in FIG. 2, which shows the clock signal, the illumination source pulses Tx and the SPAD pulse Rx. Time period t1 is the time of flight of the illumination pulse. If operating in "reverse mode", the actual time measured is time t2. Time period t1 is calculated as the difference of the length of a time frame and measured time t2. If operating in "forward mode", time period t1 is measured directly.

Figure 3:
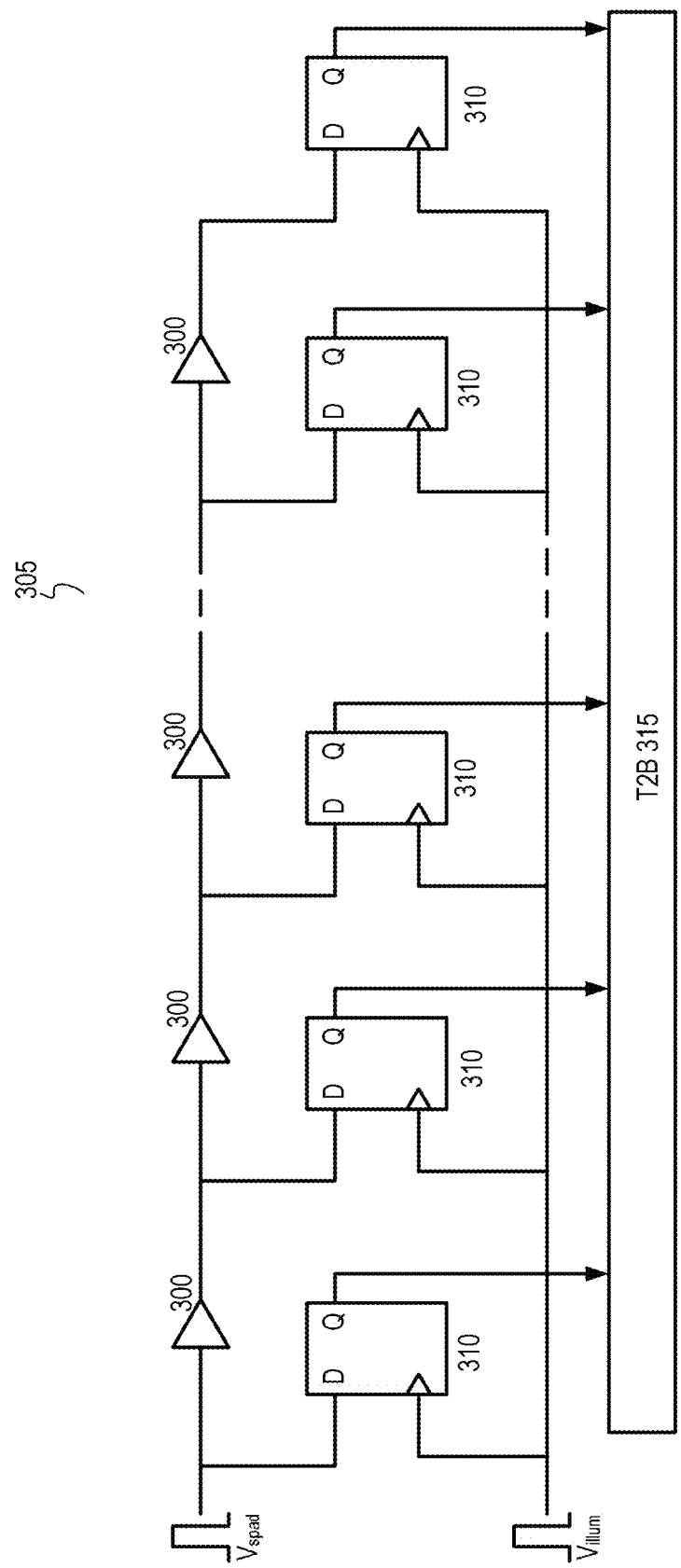
FIG. 3 shows a time to digital converter.

To measure the time of flight at a resolution greater than a clock period, a clocked delay line time to digital converter (TDC) can be used. FIG. 3 shows the layout of such a TDC 305. It comprises a line of n−1 delay elements 300, and a row of n sampling elements 310, which may be flip-flops, arranged as shown. The TDC has two inputs, one input $V_{spad}$ for reception of SPAD pulses (i.e. pulses generated by a SPAD on detection of a photon) and the other input $V_{illum}$ for illumination device pulses (i.e. pulses generated by the system coincident with emission of an illumination pulse). When a SPAD pulse is received on input $V_{spad}$ it arrives on the D input of each flip-flop, delayed in each case by a (known and fixed) delay which depends upon the position of the flip-flop 310 on the delay line. At a later time, while the SPAD pulse is travelling down the delay line, the illuminator pulse is received simultaneously on the clock inputs of each flip-flop, thereby capturing the value on each flip-flop input at that instant, and passing this value to each flip-flop output, where it is processed by the thermometer to binary (T2B) converter 315. From the transition point in the row (that is the position of the last flip-flop in the row with output high), the time between reception of the SPAD pulse and reception of the illumination pulse can be determined.

A drawback with this architecture is that only one timing event can be processed at one time, the delay line then needing to be cleared before the next event. This is due to the fact that the T2B converter 315 on the data outputs is only able to process one timing event per clock cycle. In this respect, the T2B 315 acts as a bottleneck in the timing converter. This results in converter dead time. This dead time can be reduced by adding a T-type flip-flop between the SPAD pulse input $V_{spad}$ and the delay line, with appropriate modification to the T2B block. However, this still allows only one detection event per measurement cycle.

A number of TDC architectures are proposed which enable the processing of more than one event per measurement cycle. They operate by comparing the sampled version of the input signal at one instance of time to that of another delayed instance of time, such that a change in the input signal is recorded in time. These changes are output in parallel and may be summed up or integrated in time to form a histogram in real time. Forming a histogram by summing the parallel outputs of the TDC is a compression method. The histogram formation may be performed on-chip.

Delay Line Multi-Event TDC

Figure 4:
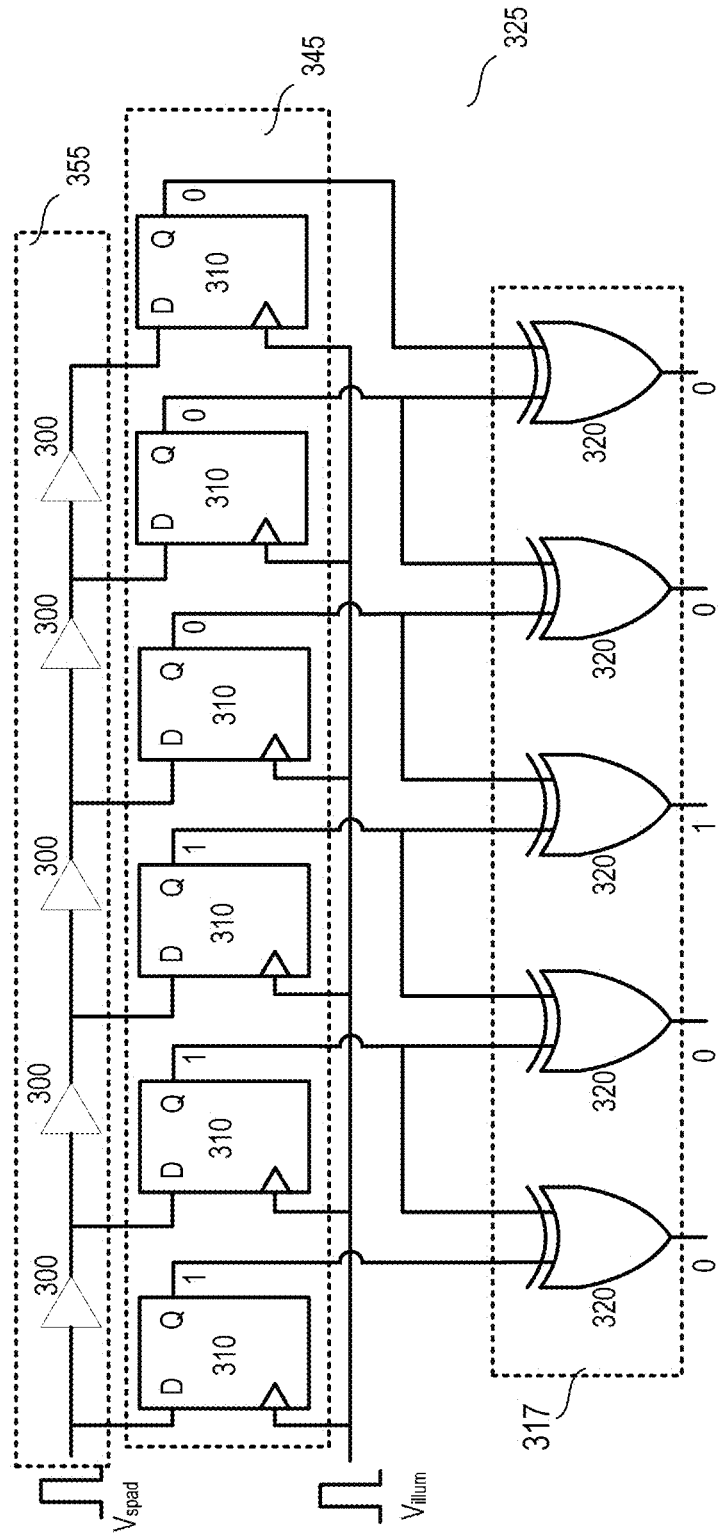
FIG. 4 shows a multi-event time to digital converter according to a first embodiment.

FIG. 4 shows a first TDC arrangement 325 which is able to process more than one event per measurement cycle. It comprises a delay module 355 having delay elements 300 and a sampling module 345 having a plurality of sampling elements 310. Sampling elements 310 are shown here as a row of flip-flops 310. These delay and sampling elements are similar to those of the example shown in FIG. 3. However, there is further provided a transition detection module 317 which acts as a parallel discriminator. The transition detection module 317 has parallel outputs instead of a conventional T2B block which has only a single output. The transition detection module 317 may comprise a row of transition detection elements, such as exclusive-OR (XOR) gates 320. Each XOR gate 320 has two inputs which receive the outputs of two adjacent flip-flops 310, one per input. In this way, the row of XOR gates 320 outputs a high state only at the location in the row of flip-flops 310 where a transition occurs. This is shown by the example state values indicated in the drawing. The SPAD pulse input $V_{spad}$ may be received via a toggle circuit such that the input to the delay line is toggled for every SPAD pulse detected.

It should be appreciated that alternative delay elements, sampling elements and/or transition detection elements may be used in this arrangement and in any of the other multi event TDC arrangements disclosed herein. For example, alternative sampling elements to D-type flip flops may include S-R latches, J-K flip-flops, etc. or any other suitable sampling elements as will be apparent to the skilled person. Alternative transition detection elements may comprise Exclusive-NOR gates, the NOT and NOR gate arrangement shown in FIG. 8A below, or any other suitable transition detection elements.

While the inputs are shown here to be receiving a SPAD pulse and illumination pulse within a time of flight measurement application, it should be appreciated that the TDC arrangements disclosed herein may be used for any other application where time to digital conversion is required, and that the input signals may be received from completely different sources. This application is for illustration only.

Figure 5:
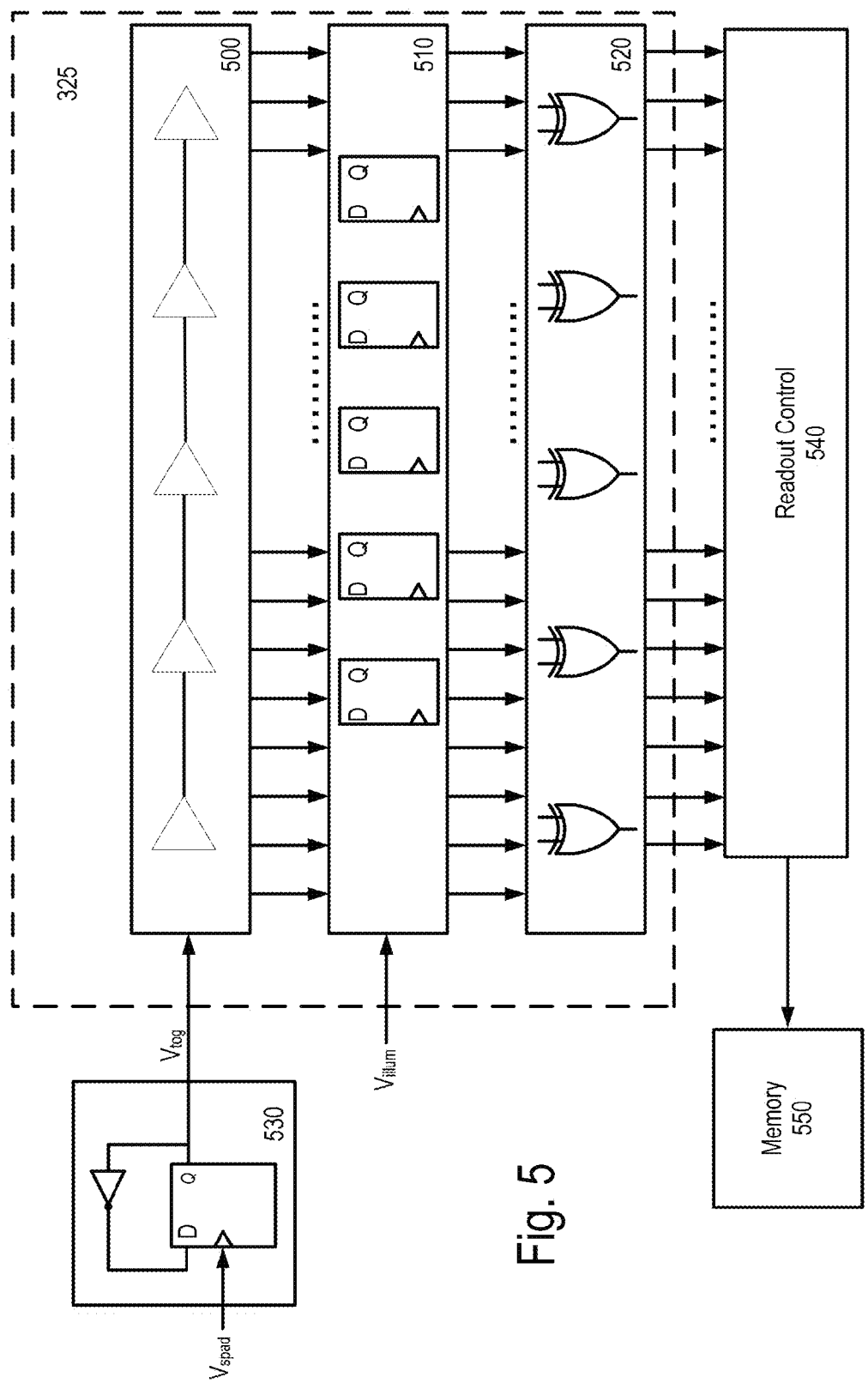
FIG. 5 shows the time to digital converter of FIG. 4 with input and readout modules.

FIG. 5 shows a particular implementation of the TDC 325 of FIG. 4. It shows delay line 500 (delay module), row of D-type flip flops 510 (sample module), and row of XOR gates 520 (transition detection module) which are arranged in a manner similar to that shown in FIG. 4. Where the delay line is an n bit delay line, there may be n D-type flip flops and n−1 XOR gates. In this arrangement the SPAD pulse signals $V_{spad}$ received from a SPAD array is inputted to the delay line 500 via a T-type flip flop 530. Also shown are a readout controller and bus 540; and accumulator and memory 550.

Figure 6:
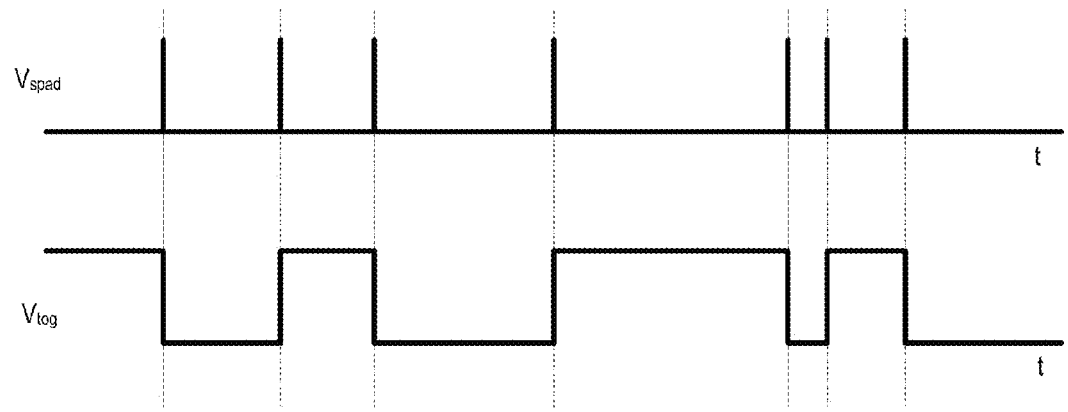
FIG. 6 is a timing diagram illustrating the principle of a toggled input.

Input signal $V_{spad}$ is fed to the clock input of the T-type flip flop 530 so that flip flop 530 output $V_{tog}$ changes state (toggles) every time a SPAD pulse is received from the SPAD array. Consequently every rising and falling edge of the flip flop's 530 output signal $V_{tog}$ represents a received pulse. This is shown in FIG. 6, which shows signal $V_{spad}$, and the resultant output signal $V_{tog}$ of the T-type flip-flop 530. It should be noted that any circuit which toggles an output on an edge can be used in place of the T-type flip-flop circuit 530.

In one embodiment, the output signals from each SPAD of the SPAD array may be combined using the output combiner described in Great Britain Patent Application GB 1216116.2 (incorporated herein by reference). Such an output combiner may replace the T-type flip-flop 530. Briefly, such an output combiner comprises a T-type flip-flop (or other toggle circuit) on each SPAD output, with the output of each T-type flip-flop being fed to an input of a cascaded Exclusive-OR (XOR) tree. The size of the tree depends on the size of the SPAD array. For an array comprising two SPAD detectors, the "tree" could in fact comprise a single XOR gate. The XOR tree provides a single output that toggles state for every SPAD pulse received.

Figure 7:
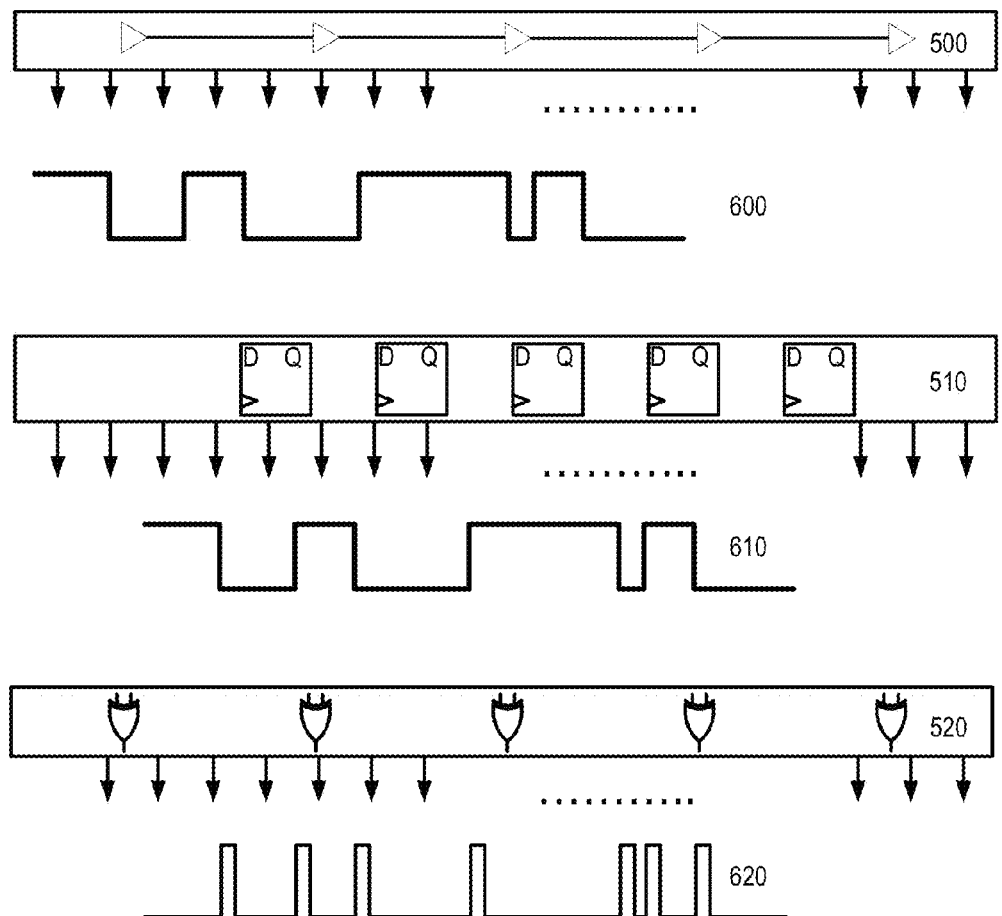
FIG. 7 is a timing diagram showing the output signal of the three main stages of the time to digital converter of FIG. 4.

FIG. 7 shows a signal 600 representing the outputs of the delay line 500 subsequent to it having received the flip flop output signal $V_{tog}$ of FIG. 6, a signal 610 representing the outputs of the row of flip-flops 510 a short time later, having been strobed by a clock pulse, and a signal 620 representing the resultant outputs of the row of XOR gates 520. It can be seen that signal 620 shows a pulse for every edge of signal 610, each pulse representing a SPAD event. By accumulating the pulses within a number of bins, each bin representing a time period in which the pulse was received, a histogram may be formed. This histogram may be analyzed in numerous ways dependent on the application (e.g. FLIM). For instance in range finding the maximum value of the peak or alternatively the centroid of the peak, are sought, from which time of flight (and therefore a distance/proximity measurement) may be inferred.

Edge Detection

Figure 8A:
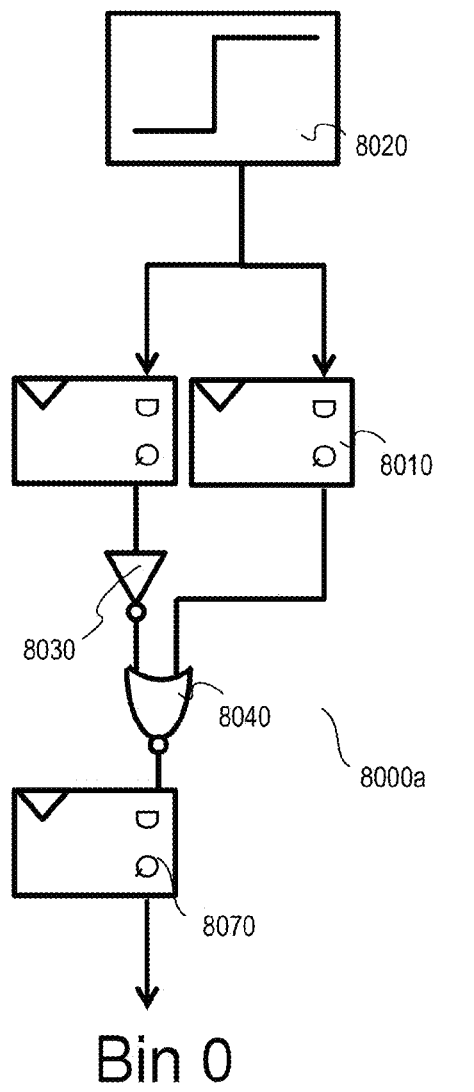
FIGS. 8A and 8B show individual cells of a time to digital converter according to embodiments.
Figure 8B:
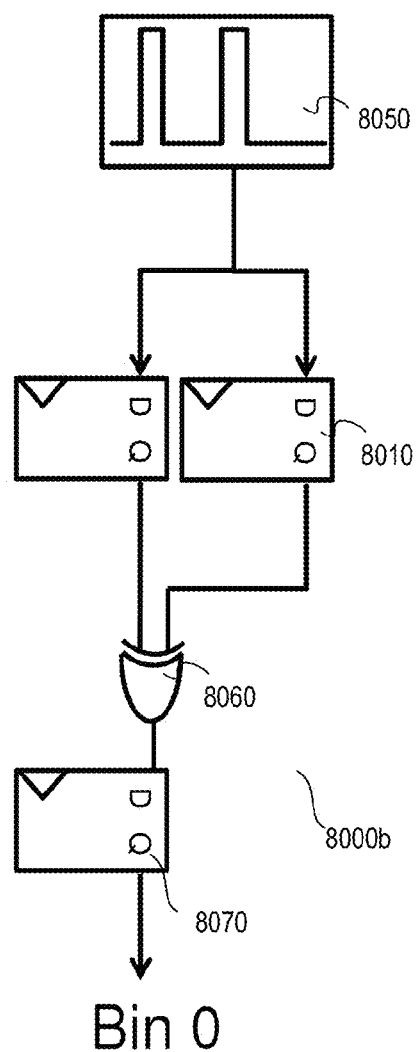

FIGS. 8A and 8B depict a transition detection cell 8000*a*, 8000*b* of a multi-event TDC according to embodiments of the invention. Each of the multi-event TDCs disclosed herein can be constructed from one of these cells (or similar). Each of FIGS. 8A and 8B show an input fed into two sampling elements, here shown as D-type input flip-flops 8010. Shown here are two variations of the TDC core logic for the three types of edge detection:

Positive edge detection
Negative edge detection
Positive and negative edge detection (toggled input)

FIG. 8A is a TDC cell operable to receive a positive or negative edge input 8020. It comprises a not gate 8030 on one input flip flop output, both outputs then being fed into a transition detection element, here a NOR gate 8040. For negative edge detection, the inputs of the transition detection element are reversed from those shown here. FIG. 8B is a TDC cell operable to receive a toggled input 8050. Here the outputs of both input flip-flops are fed into a transition detection element, here an XOR gate 8060. The outputs of each cell may be latched by a further output flip-flop 8070.

Folded Flash Multi Event TDC

The examples of FIGS. 5 to 7 describe a delay line TDC adapted to accept multiple SPAD events (or other multiple input events). The foregoing embodiments adapt a Flash TDC similarly. Delay Line TDCs are based on sampling an asynchronous delay line. Flash TDCs are based on synchronously sampling the input (e.g. SPAD pulse) with multi-phase clocks.

Figure 9:
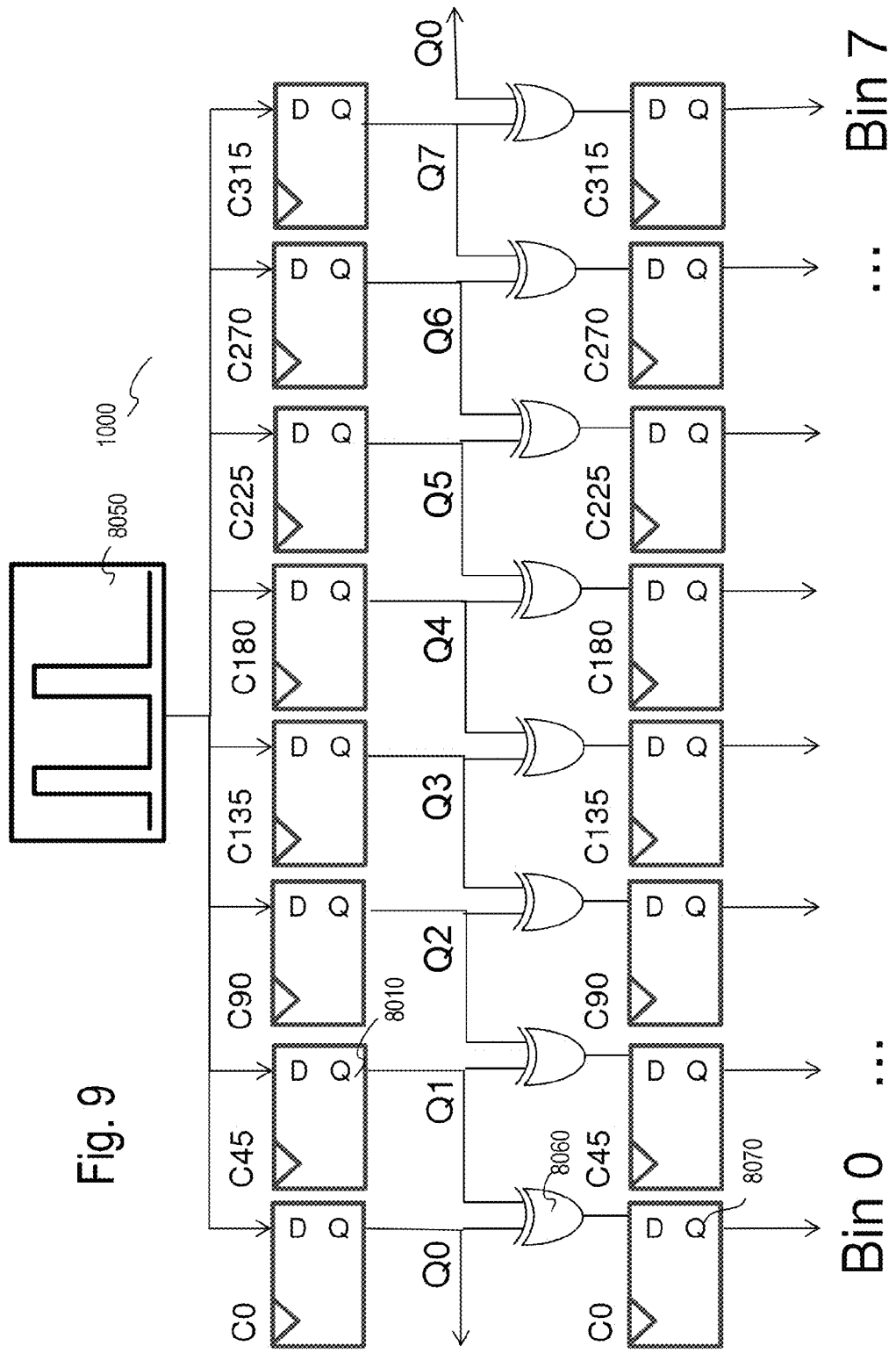
FIG. 9 shows a multi-event time to digital converter according to a second embodiment.
Figure 10:
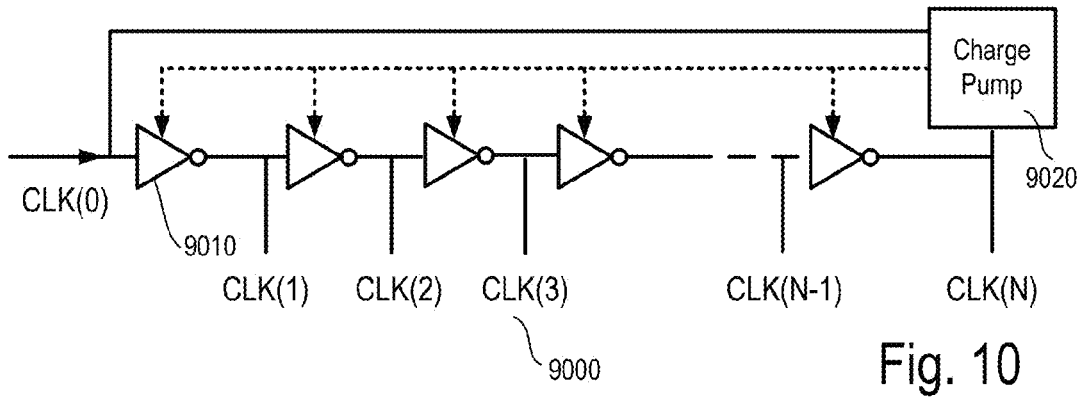
FIG. 10 shows a first timing signal generation module usable in embodiments.

FIG. 9 shows a folded flash TDC 1000 comprising eight of the cells 8000*b* illustrated in FIG. 8B (N=8). A similar TDC may be constructed using the cells 8000*a* illustrated in FIG. 8A. The toggled input 8050 is received in parallel on the input flip-flops 8010, each input flip-flop being clocked in turn by a timing reference signal C0-C315 (eight phases of a clock signal). An 'H-tree' layout for the wire that carries the toggle input signal may be used to ensure there is no timing mismatch between each of the input flip-flops 8010. Timing reference signals C0-C315 may be obtained from a timing reference generation module 9000 such as shown in FIG. 10, in which case they correspond to signals CLK(0)-CLK(7). The timing difference is denoted by clock cycles 'C0', 'C45' (45 degrees out of phase), 'C90' (90 degrees out of phase) etc. Adjacent pairs of Q outputs of each input flip-flop 8010 are fed into an XOR gate 8060, the output of each XOR gate being fed into output flip-flops 8070, which are also clocked in turn by the timing reference signal C0-C315. The output of each of these output flip-flops constitutes an output bin (Bin 0-Bin 7). The folded design is evident here as Q0 is folded or wrapped from the first input flip flop 8010 to the input of the last XOR gate 8060.

FIG. 10 shows a phase-locked loop (PLL)-based timing reference generation module 9000 suitable for providing the clock signals for the Flash TDC depicted in FIG. 9, wherein each sampling element receives a different equally spaced timing reference or clock input. It comprises N delay elements 9010 and a charge pump 9020 arranged as shown. The parallel outputs CLK(0)-CLK(N) from the timing reference module 9000 are slightly delayed in time relative to each other. This difference in time creates the sampling window in time. Any mismatch in the delay between two timing reference signals will produce a mismatch in the sampling window manifesting itself as linearity error in the time conversion. The operation of such phase locked loops is well known and will not be described in detail. A PLL based timing reference module is shown here for illustration only and the timing references may be generated using parallel outputs from any suitable timing module; for example a delay locked loop (DLL), PLL, active delay line, passive delay line, etc.

Figure 11:
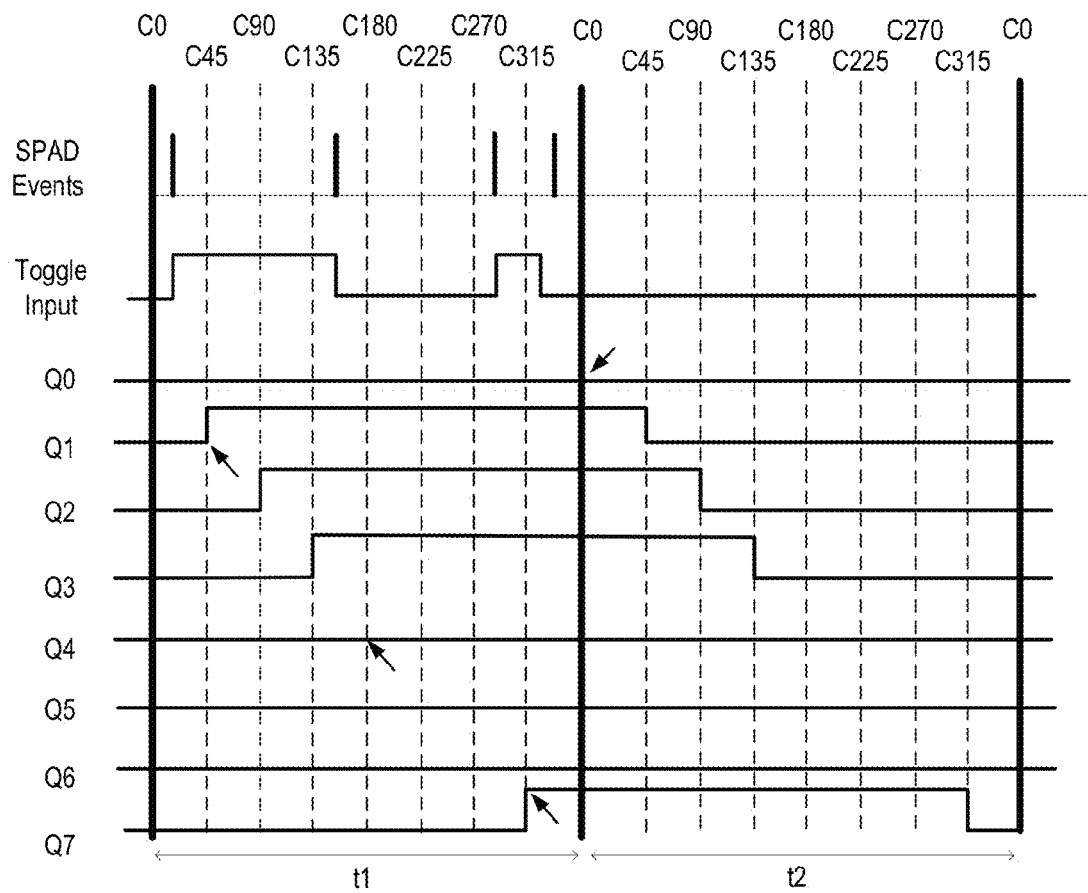
FIGS. 11 and 12 are timing diagrams illustrating an operational embodiment of the multi-event time to digital converter of FIG. 9.

FIG. 11 is a timing diagram illustrating operation of the TDC of FIG. 9 over two clock cycles t1, t2, each cycle divided into phases C0-C315. It shows four SPAD events occurring within the first clock cycle t1, and the consequent toggle input to the TDC (this signal toggling for each SPAD event). Also shown are the resultant Q outputs Q0-Q7 of the input flip flops. Each arrow indicates a level transition in one of the signals Q(n) compared to the level of the preceding signal Q(n−1), each of these transitions corresponding to a SPAD event occurring during the preceding clock phase.

Figure 12:
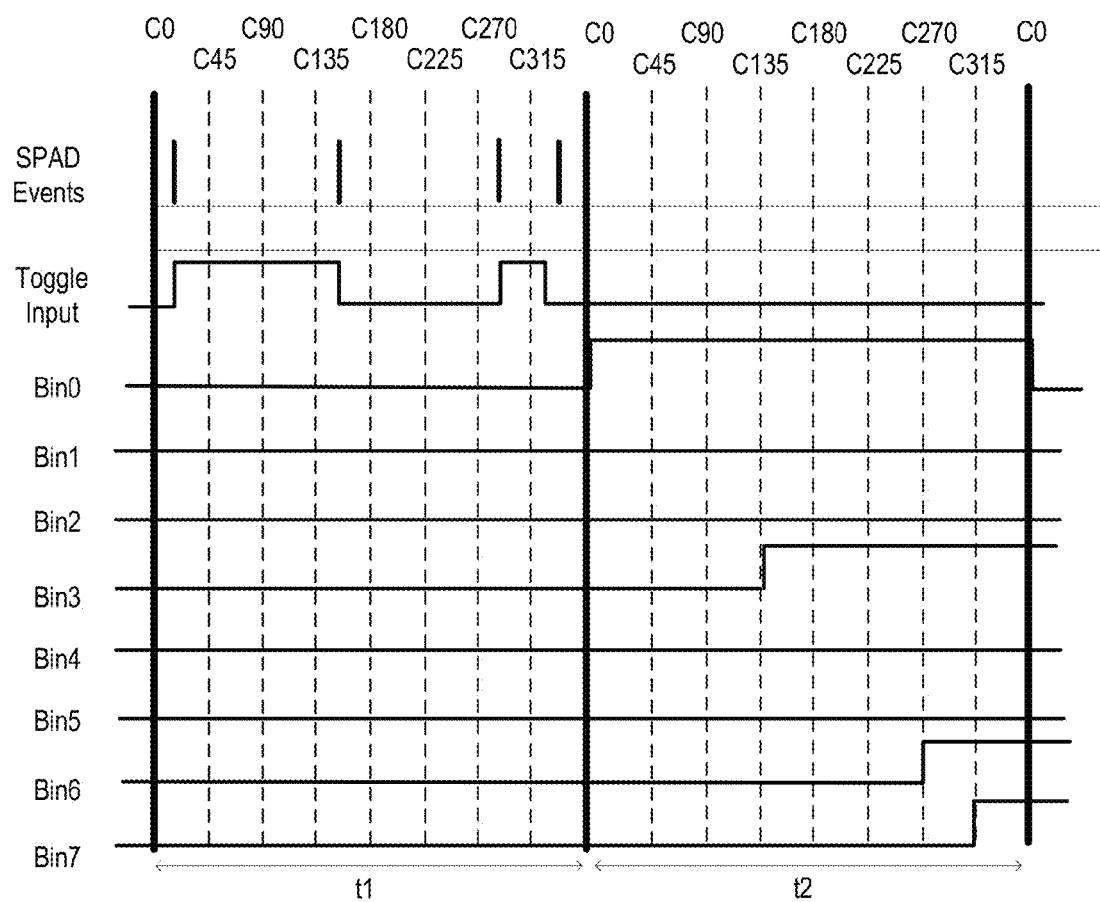

FIG. 12 is a timing diagram illustrating operation of the TDC of FIG. 9 over the same two clock cycles t1, t2 as FIG. 11, but this time showing the state of signals Bin0-Bin7. These are all low throughout the first cycle t1 (indicating no SPAD events occurred in the cycle immediately preceding cycle t1). During the second clock cycle, signals Bin0, Bin3, Bin6 and Bin7 each go high when their corresponding output flip-flop 8070 is clocked by its respective timing reference signal C0, C135, C270, C315. In this way, a signal Bin0-Bin7 going high in one cycle corresponds to the timing of a received SPAD pulses during the previous cycle. Of course, there may be SPAD events occurring during this second cycle t2 (although none are shown during the second cycle t2 here), thereby changing the state of signals Q0-Q7 simultaneously with the changes of state of signals Bin0-Bin7 shown here. In this way, continuous operation is possible.

Interpolative Folded Flash TDC

As mentioned before, the timing signals C0-C315 may be obtained from a timing reference generation module (e.g. module 9000) based around a DLL or PLL. To re-use the hardware of the module's clock buffers (and histogram counters), a folded clock switching network may be introduced.

Figure 13:
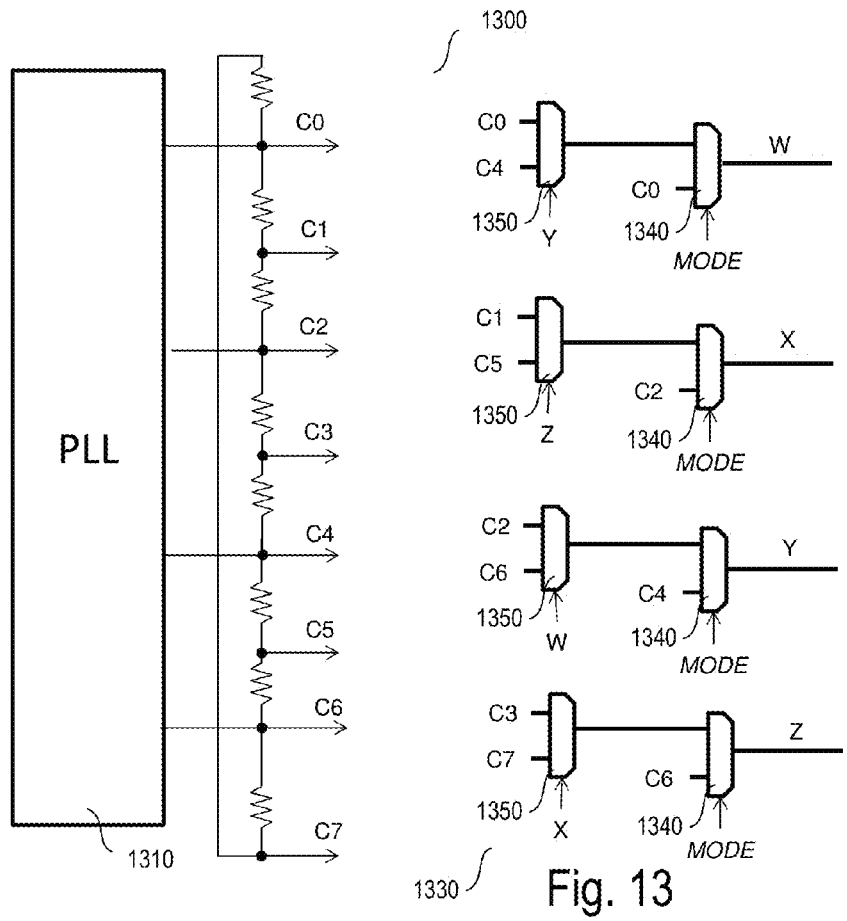
FIG. 13 shows a second timing signal generation module usable in embodiments.

FIG. 13 illustrates a timing reference generation module 1300 (with N=4) adapted in such a manner. It comprises a 4-phase PLL 1310, a resistor ladder ring 1320 and a switching network 1330 arranged as shown. The use of a resistor ladder in between two clock signals (one of which is slightly delayed) creates timing pulses that are below a gate-delay apart in between the two inputs. The resistor ladder ring 1320 is added to the output of the timing reference module 1300 thereby enabling the creation of an interpolative folded TDC, when used with a folded flash TDC, (e.g. TDC 1000 of FIG. 9).

The interpolative folded flash TDC can operate in two modes. The first mode is essentially the same as that described in relation to the TDC of FIG. 9 (with N=4). In this mode, signal MODE selects the directly connected PLL 1310 output C0, C2, C4, C6 (shown as the bottom input of the second multiplexer 1350 in each case) to the TDC clock inputs. Therefore the 4 PLL outputs of the 4 phase PLL 1310 are directly connected to the TDC. Of course, the number of phases shown here is purely illustrative and may be varied.

In the second mode of operation, the resistor ring 2200 is switched in so as to increase the timing resolution. Each clock output now runs at twice the frequency with half the gate delay and double the timing precision. The dynamic range of the TDC is halved.

This example shows 4 PLL 1310 outputs (N=4) and 2 resistors (R=2) between pairs of these outputs. To re-use the clock network, the first multiplexers 1340 select between two outputs each (L=N/R=2) such that the clock outputs have been folded twice. Signal MODE is set on the second multiplexers 1350 so as to connect the output of the first multiplexers 1340 to the TDC.

In this interpolative mode, the direct-to-histogram counters (see below) can also be re-used. Each histogram bin counter represents the timing resolution of the standard mode divided by 'L'. In the above example, where L=2, the timing resolution of one histogram bin is halved in the interpolative mode.

In a simpler embodiment only the interpolative mode is provided, the switch network comprising only first multiplexers 1350.

Dynamic Range Extension

Figure 14:
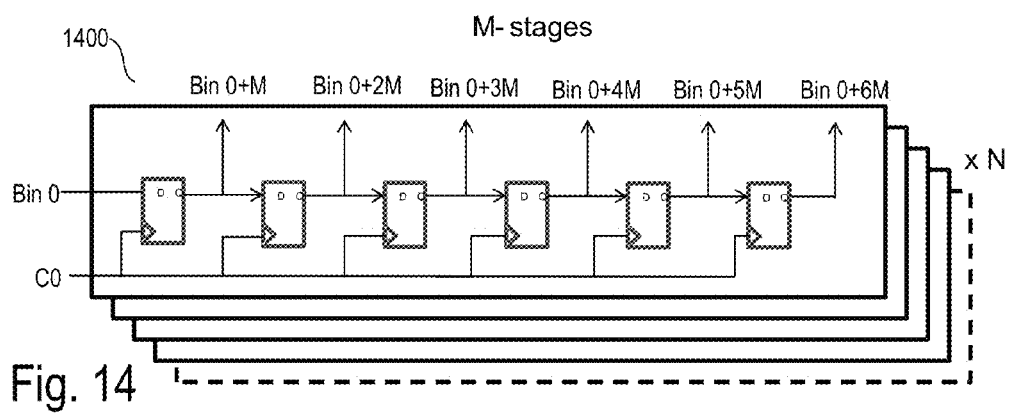
FIG. 14 shows an output arrangement for extending the dynamic range of the TDC of FIG. 9.

The dynamic range of the front end of the Flash TDC as described above is equal to one clock period. To extend the dynamic range a synchronous pipelined shift register 1400 may be attached to each of the TDC outputs. For example, a 10-stage pipeline (M=10) added to an 8 phase PLL (N=8) will produce an 80 output (M×N=80) TDC with ten times the dynamic range of a single stage TDC. Each pipeline is connected to the same clock as the TDC output flip-flop to which it is connected. FIG. 14 depicts a six stage pipeline (M=6) 1400 in accordance with this embodiment.

Direct to Histogram Output

A main advantage of the TDCs described above is that they allow the timing of multiple SPAD events within a measurement cycle to be recovered. However, any system readout would need to operate at a high clock frequency to readout. TDC readout speed and throughput is a limiting factor on the measurement rate. This results in a measurement dead time whereby the TDC is effectively disabled to allow the system to readout the data. This can be addressed by using a direct to histogram output.

The TDC (with or without dynamic range extension) has multiple parallel outputs. Each one of these outputs constitutes one 'bin' in a timing histogram or one TDC timestamp/output code. The direct to histogram function is a compression method. It allows the summation/integration of TDC timestamps in real time without having to read raw TDC codes off-chip. There are two implementations of the direct to histogram.

Bank of Counters

The bank of counters is the simplest implementation of the direct to histogram output.

Figure 15:
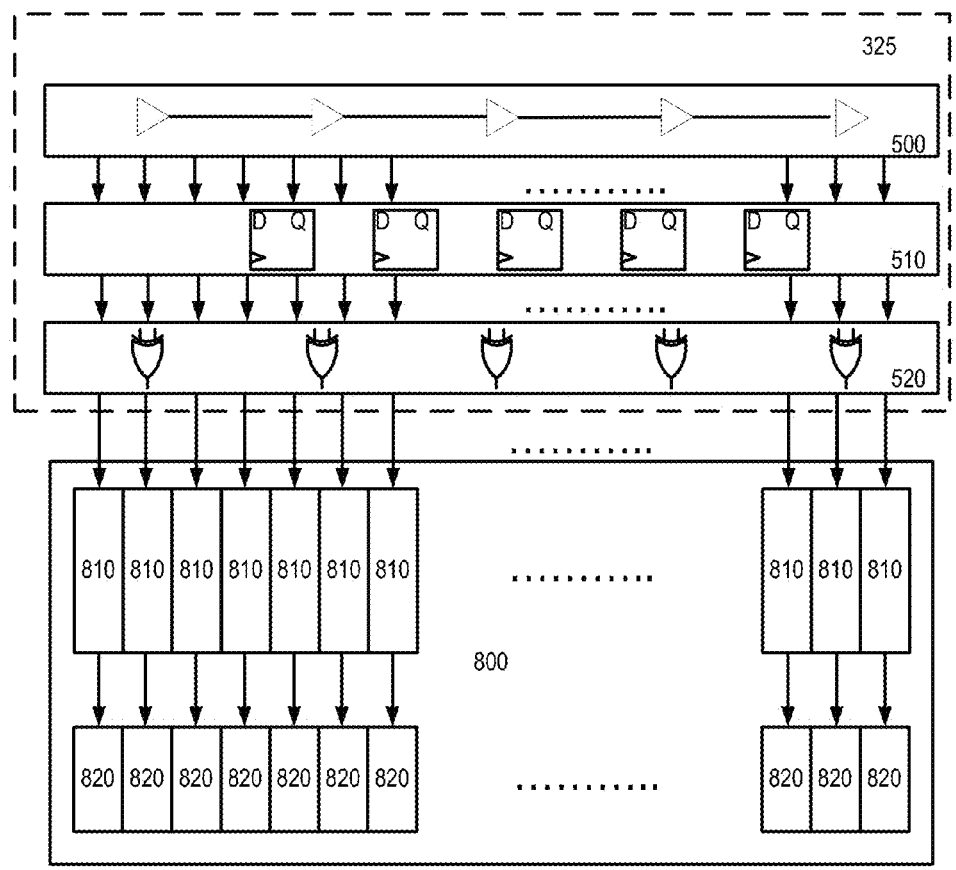
FIG. 15 shows the time to digital converter of FIG. 4 with a readout module according to an embodiment.

FIG. 15 shows a TDC arrangement with optional readout arrangement 800. The TDC 325 is similar to that of FIGS. 4 and 5 (although it could be any TDC disclosed herein). The readout arrangement comprises an integrating bin counter 810 and optional corresponding register 820 on each TDC (XOR gate) output. This allows the TDC to continue operation over a number of cycles. The outputs of the integrating counters 810 directly form a histogram. This histogram can be read out to the rest of the system (slower clock domain) for further processing.

Figure 16:
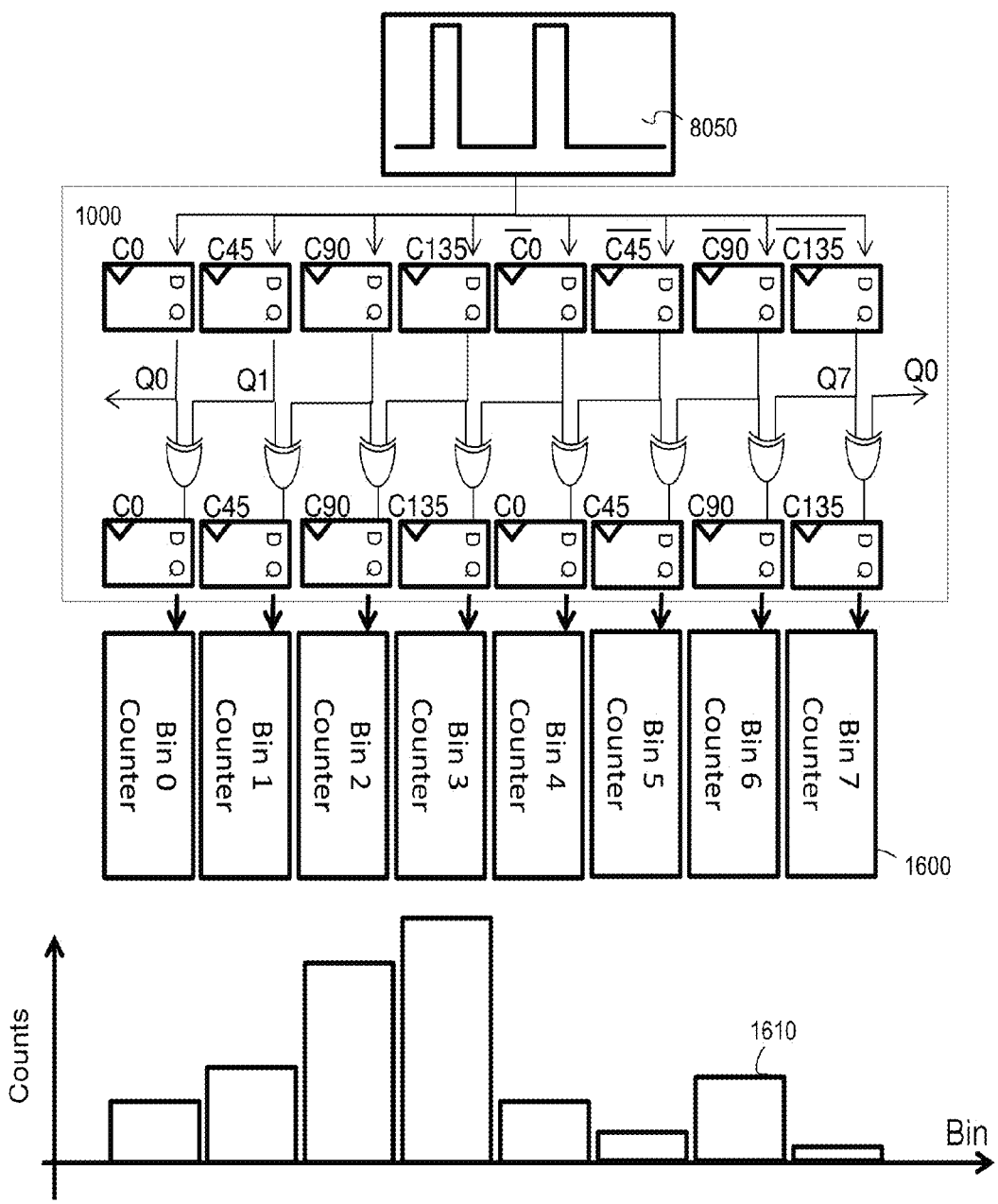
FIG. 16 shows the time to digital converter of FIG. 9 with readout counters according to an embodiment.

FIG. 16 shows a corresponding example using an eight stage folded flash TDC 1000 with no dynamic range extension (N=8, M=1) comprising bin counters 1600 for forming a direct to histogram output 1610.

Parallel T2B Cells with Parallel Memory and Adder Cells

An alternative implementation of the direct to histogram function is realized with a parallel thermometer to binary code (T2B) converters and parallel memory and adder cells.

Figure 17:
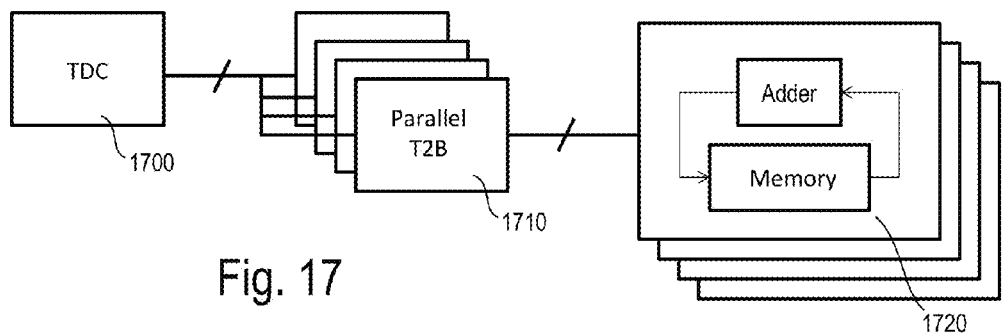
FIG. 17 shows a time to digital converter arrangement comprising parallel thermometer to binary code (T2B) converters and parallel memory and adder cells.

FIG. 17 illustrates such an arrangement. It shows M×N parallel outputs from a TDC 1700 (which may be any TDC disclosed herein) is fed into a number of parallel T2B converters 1710 and then into M×N memory and adder cells 1720. The number of parallel T2B converters is appropriate to the design of the T2B cell and the M×N sizing of the TDC.

Multiple TDC Channels

Multiple TDCs 1800 may be used in parallel to increase the system throughput. The direct to histogram implementation is area intensive (one counter or memory per parallel output). Therefore multiple TDC channels may be synchronously added in parallel, using adders 1810, into one direct to histogram bank 1820. The TDCs may be any TDC disclosed herein.

Time of Flight Measurement Range Finder

An issue with time of flight measurement systems is that the illuminator and timing generator may introduce unknown delays which can adversely affect the accuracy of the TDC measurement. The embodiments shown in FIGS. 19 and 20 aim to address this issue.

Figure 19:
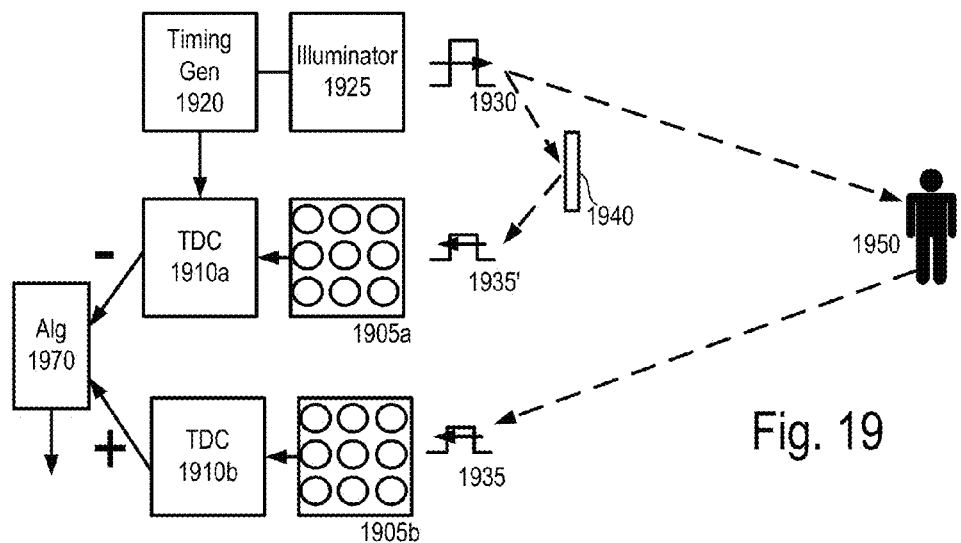
FIG. 19 shows a second time of flight imaging system according to an embodiment.

FIG. 19 shows any of the TDCs disclosed herein, being used as the basis of a Time of Flight measurement range finder. It comprises timing generator 1920, illumination source 1925, calibration TDC 1910*a* with associated SPAD array 1905*a* and internal reflector 1940, measurement TDC 1910*b* with associated SPAD array 1905*b* and algorithm module 1970.

Under control of timing generator 1920, the illumination source 1925 emits pulse 1930. This pulse reflects off object 1950 to become reflected pulse 1935, which is detected by SPAD array 1905*b*. The TDC 1910*b* is operable to produce a histogram based upon the timing of SPAD events, as described above. The measured time of flight of each pulse will be the total of the actual time of flight and the delays introduced by the timing generator 1920 and illumination source 1925. Pulse 1930 also reflects off a reflector 1940, at a known distance from the source. The reflected pulse 1935' is detected by SPAD array 1905*a* and the TDC 1910*a* again provides a histogram based upon the timing of SPAD events. Algorithm module 1970 subtracts one histogram from the other, so as to cancel for the aforementioned delays in the system.

Each histogram is processed to extract the range value. This processing may be performed in a manner of different ways, such as using the range with the maximum value, finding the centroid of the histogram peak, etc. The range from the histogram of TDC 1910*a* is the 'zero' distance or reference range and the range from the histogram of TDC 1910*b* is the measured range to the target. By subtracting the range from histogram 1910*a* from the range from histogram 1910*b*, the distance to the target is calculated.

Figure 20:
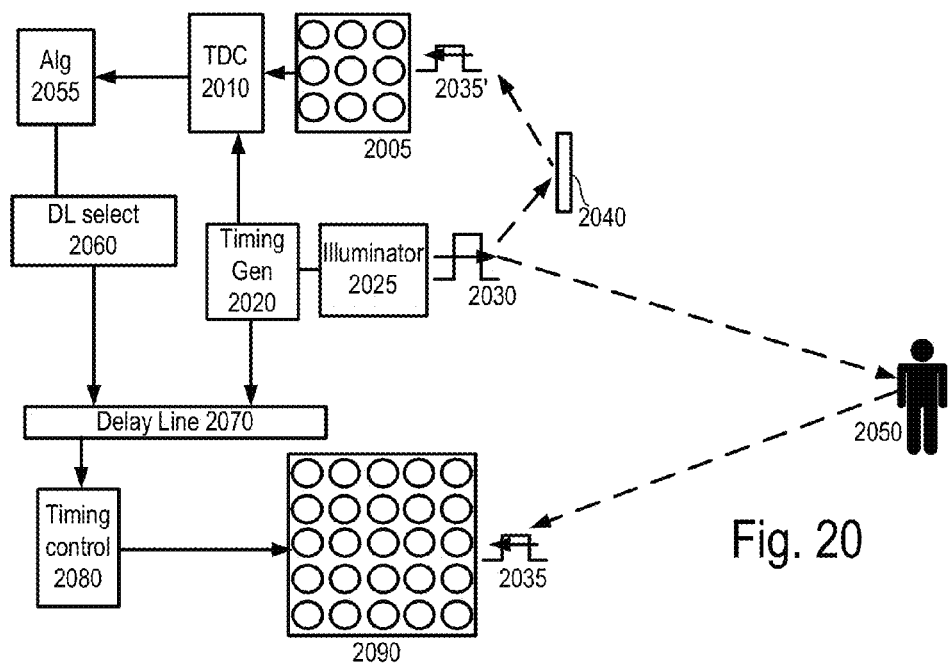
FIG. 20 shows a third time of flight imaging system according to an embodiment.

FIG. 20 shows any of the TDCs as disclosed herein, being used for calibration of a time of flight imaging system. The time of flight imager comprises imaging array 2090, timing control 2080, delay line 2070, timing generator 2020 and illumination source 2025. To measure the illuminator/timing generator delay offset, the imaging system further comprises calibration TDC 2010 with associated SPAD array 2005 and internal reflector 2040, algorithm module 2055 and delay line tap select 2060.

Using the calibration TDC 2010 in a similar way as described in relation to FIG. 19, a histogram can be obtained from which the illuminator delay offset can be determined. This offset can then be calibrated for, by delaying the imager timing signals. As previously described, the 'zero' distance or calibration range is extracted from the histogram output of TDC 2010. This function is performed in algorithm block 2055. This range value is used to shift the timing signals for the sensor. This allows time-gating/time-windowing the imager to improve signal-to-noise ratio by shuttering the imager open for the duration of the known measurement range, and closed for ambient periods.

The TDC arrangements disclosed herein may be used in the following applications, amongst others:
Depth profiling or range finding
  Consumer, Automotive, Security, Industrial applications
LIDAR (Light Detection And Ranging)
  3D Depth Images built up by raster scanning using TDC based system
Medical and Biological Imaging
  Fluorescence Lifetime Imaging Microscopy (FLIM)
  Positron Emission Tomography (PET) Scanning It should be appreciated that the above description is for illustration only and other embodiments and variations may be envisaged without departing from the spirit and scope of the invention.

What is claimed is:

1. A time to digital converter, comprising:
  a sampling module configured to sample an input signal at multiple different instances of time;
  a transition detection module comprising a plurality of comparison elements, each comparison element configured to process the sampled input signal at successive instances of time so as to detect transitions in the input signal in terms of time;
  an output module comprising multiple parallel outputs with each output operable to output a detection signal indicating a detected transition in the input signal; and
  a counter circuit for each output of said multiple parallel outputs, wherein a value of each counter circuit is incremented in response to receipt of the detection signal.

2. The time to digital converter as claimed in claim 1, wherein each of said comparison elements comprises a two-input logic gate, each of its inputs being connected to a respective one of adjacent outputs of said sampling module.

3. The time to digital converter as claimed in claim 2, wherein each two-input logic gate comprises one of a two-input exclusive-OR gate or a two-input exclusive-NOR gate.

4. The time to digital converter as claimed in claim 1, further comprising a toggle module operable to toggle the input signal between two states on each occasion that a timing event is detected.

5. The time to digital converter as claimed in claim 4, wherein said toggle module comprises a T-type flip-flop.

6. The time to digital converter as claimed in claim 1, wherein said sampling module comprises a plurality of sample elements, each sample element being operable to sample the input signal at a different time instance.

7. The time to digital converter as claimed in claim 6, wherein each of said sample elements comprises one of a flip-flop or latch circuit.

8. The time to digital converter as claimed in claim 7, wherein said sample elements comprise D-type flip-flops.

9. The time to digital converter as claimed in claim 6, further comprising a delay module configured to receive the input signal and output in parallel multiple delayed versions of said input signal to said sampling module.

10. The time to digital converter as claimed in claim 9, wherein said delay module comprises a delay line having a plurality of delay elements.

11. The time to digital converter as claimed in claim 9, wherein each sample element is operable to receive one of said delayed versions of said input signal on its input, said sampling module configured to simultaneously sample each of said delayed versions of the signal received on the sample elements when clocked by a clock signal.

12. The time to digital converter as claimed in claim 6, further comprising a timing reference generation module configured to output multiple clock signals, each clock signal at a different phase; each clock signal configured to clock one of said sample elements such that each sample element samples the input signal at a different clock phase.

13. The time to digital converter as claimed in claim 12, wherein said timing reference generation module comprises one of a phase-lock-loop or a delay-lock-loop.

14. The time to digital converter as claimed in claim 12, wherein the timing reference generation module comprises a resistor ladder ring on its output and a corresponding switching network, said resistor ladder ring providing additional clock phase outputs, said switching network configured to select between the clock phase outputs so as to increase the timing resolution of the timing reference generation module.

15. The time to digital converter as claimed in claim 12, wherein said output module is operable to sample the transitions detected in the preceding clock cycle.

16. The time to digital converter as claimed in claim 15, wherein said output module comprises further sample elements, each of said further sample elements configured to sample one of the signals output from the transition detection module when clocked by a respective one of said multiple clock signals.

17. The time to digital converter as claimed in claim 12, wherein said time to digital converter is of a folded design, wherein said comparison elements are arranged in a ring formation such that each input of each comparison elements is connected to a respective output of said sampling module and to an input of an adjacent comparison element.

18. The time to digital converter as claimed in claim 1, wherein the counter circuits together form a readout module operable to accumulate the transitions detected at each of said multiple outputs with the accumulated transitions producing a histogram.

19. A time to digital converter, comprising:
  a sampling module configured to sample an input signal at multiple different instances of time;
  a transition detection module comprising a plurality of comparison elements, each comparison element configured to process the sampled input signal at successive instances of time so as to detect transitions in the input signal in terms of time;

an output module comprising multiple parallel outputs operable to output detection signals indicating in parallel said detected transitions in the input signal, wherein each of said multiple parallel outputs comprises a synchronous pipelined shift register so as to increase the dynamic range of the time to digital converter.

20. The time to digital converter as claimed in claim 19, wherein each of said comparison elements comprises a two-input logic gate, each of its inputs being connected to a respective one of adjacent outputs of said sampling module.

21. The time to digital converter as claimed in claim 20, wherein each two-input logic gate comprises one of a two-input exclusive-OR gate or a two-input exclusive-NOR gate.

22. The time to digital converter as claimed in claim 19, further comprising a toggle module operable to toggle the input signal between two states on each occasion that a timing event is detected.

23. The time to digital converter as claimed in claim 22, wherein said toggle module comprises a T-type flip-flop.

24. The time to digital converter as claimed in claim 19, wherein said sampling module comprises a plurality of sample elements, each sample element being operable to sample the input signal at a different time instance.

25. The time to digital converter as claimed in claim 24, wherein each of said sample elements comprises one of a flip-flop or latch circuit.

26. The time to digital converter as claimed in claim 25, wherein said sample elements comprise D-type flip-flops.

27. The time to digital converter as claimed in claim 24, further comprising a delay module configured to receive the input signal and output in parallel multiple delayed versions of said input signal to said sampling module.

28. The time to digital converter as claimed in claim 27, wherein said delay module comprises a delay line having a plurality of delay elements.

29. The time to digital converter as claimed in claim 27, wherein each sample element is operable to receive one of said delayed versions of said input signal on its input, said sampling module configured to simultaneously sample each of said delayed versions of the signal received on the sample elements when clocked by a clock signal.

30. The time to digital converter as claimed in claim 24, further comprising a timing reference generation module configured to output multiple clock signals, each clock signal at a different phase; each clock signal configured to clock one of said sample elements such that each sample element samples the input signal at a different clock phase.

31. The time to digital converter as claimed in claim 30, wherein said timing reference generation module comprises one of a phase-lock-loop or a delay-lock-loop.

32. The time to digital converter as claimed in claim 30, wherein the timing reference generation module comprises a resistor ladder ring on its output and a corresponding switching network, said resistor ladder ring providing additional clock phase outputs, said switching network configured to select between the clock phase outputs so as to increase the timing resolution of the timing reference generation module.

33. The time to digital converter as claimed in claim 30, wherein said output module is operable to sample the transitions detected in the preceding clock cycle.

34. The time to digital converter as claimed in claim 33, wherein said output module comprises further sample elements, each of said further sample elements configured to sample one of the signals output from the transition detection module when clocked by a respective one of said multiple clock signals.

35. The time to digital converter as claimed in claim 30, wherein said time to digital converter is of a folded design, wherein said comparison elements are arranged in a ring formation such that each input of each comparison elements is connected to a respective output of said sampling module and to an input of an adjacent comparison element.

\* \* \* \* \*